July 3, 1934.　　　　　G. B. STORER　　　　　1,965,267
AUTOMOBILE AXLE
Filed Jan. 13, 1930　　2 Sheets-Sheet 1
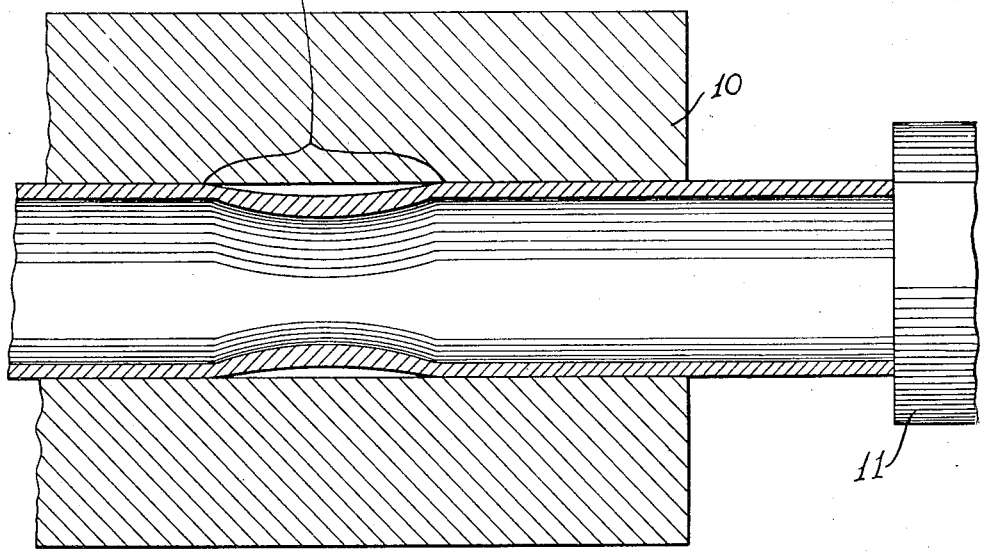
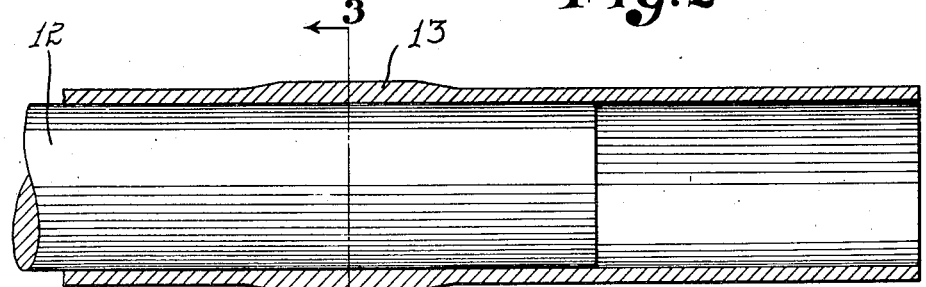
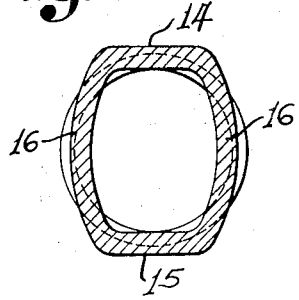
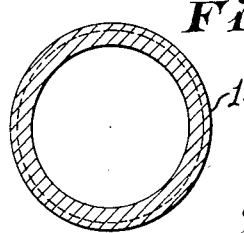
Inventor
George B. Storer
By Owen & Owen
Attorneys July 3, 1934.  G. B. STORER  1,965,267
AUTOMOBILE AXLE
Filed Jan. 13, 1930  2 Sheets-Sheet 2
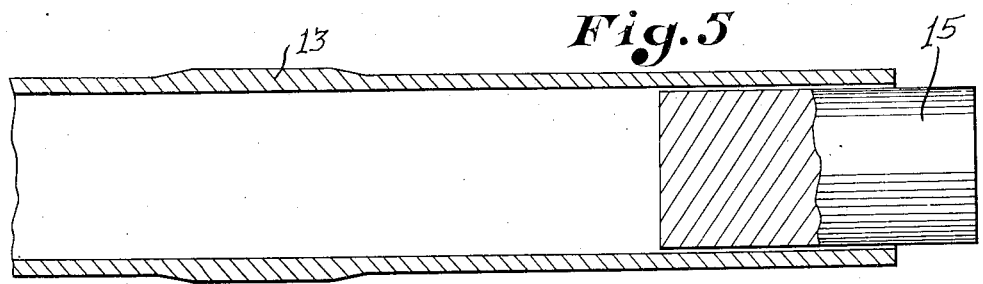
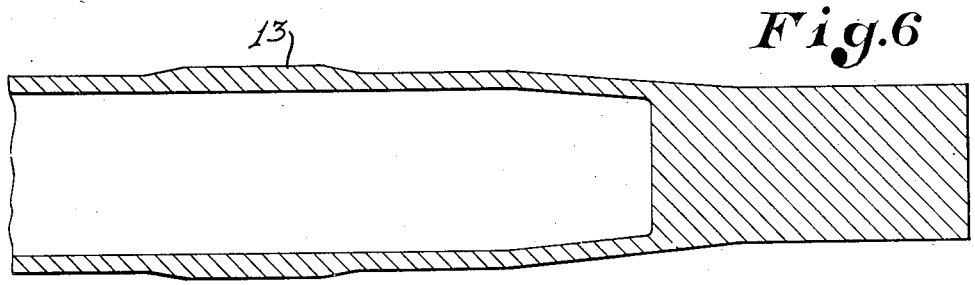
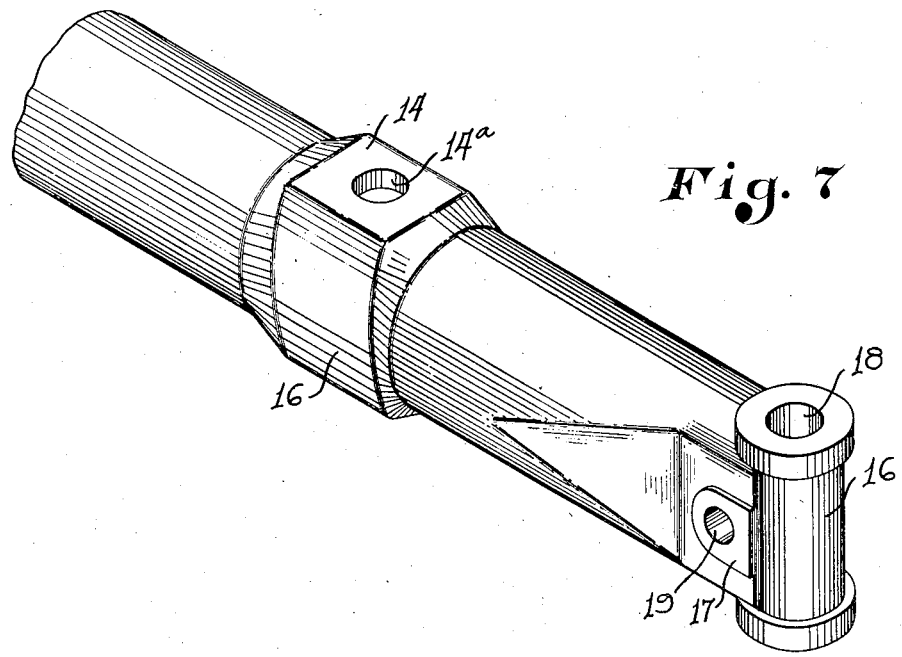
Inventor
George B. Storer
By Owen & Owen
Attorneys Patented July 3, 1934

1,965,267

UNITED STATES PATENT OFFICE 1,965,267

AUTOMOBILE AXLE

George B. Storer, Detroit, Mich., assignor, by mesne assignments, to Urschel Engineering Company, Toledo, Ohio, a corporation of Ohio Application January 13, 1930, Serial No. 420,544

2 Claims. (Cl. 301—124)

This invention relates to axles for vehicles, particularly automobiles, and has for its object a provision of an axle formed from steel tubing, which is so formed as admirably to withstand the stress imparted thereto in conditions of service.

A further object is to provide a new and improved front axle for an automobile of the Ford type, which is equipped with spring perch seats integrally formed on the axle, and sufficiently reinforced to withstand the stresses imparted thereto, the end portions of which are equipped with rigid and sturdy bearings to support the axle stubs.

The invention is shown by way of illustration, but not of limitation, in the accompanying drawings where an embodiment thereof is represented. In the drawings, Fig. 1 is a longitudinal sectional elevation showing one step in the forming of the spring perch seat, in which the tube is disposed within a die, and is subjected to end pressure;

Fig. 2 is a sectional elevation showing another step in the forming of the spring perch seat, in which a mandrel is inserted in the tube for forcing the collapsed portion of the tube outwardly;

Fig. 3 is a transverse sectional elevation on the line 3—3 of Fig. 2;

Fig. 4 is a transverse sectional elevation showing the spring perch seat after being subjected to a pressing or squeezing operation to flatten the top and bottom sides and outwardly bow the lateral sides;

Fig. 5 is a longitudinal sectional elevation showing one step in the formation of the end portion of the axle in which a plug is inserted into the tube;

Fig. 6 is a view similar to Fig. 5, in which the tube axle is swaged and welded to the plug; and Fig. 7 is a perspective view of a portion of the axle as completed.

In the illustrated embodiment of the invention the axle, which may be that for use in connection with an automobile of the Ford type, is formed from steel tubing, and although this may be formed from seamless steel tubing, it is preferable to use longitudinally seamed tubing in order to minimize costs. After the tubing has been cut to the desired length it is heated adjacent each end portion. Preferably, the metal is heated between 2,000 and 2,300 degrees, in order to make the metal relatively soft. As indicated in Fig. 1, the area A is heated, as above explained, although the length of the tubing subjected to heat may be varied as desired, and in accordance with the demand. After the area A has been heated to the desired degree it is inserted into a die 10, which confines the peripheral surface of the tube. Thereafter, the tube is subjected to end pressure, as by means of a plunger 11, in order to force the metal of the area A together, thereby to increase the thickness of the tube walls in that region. In carrying out this step pressure may be exerted from opposite ends of the tube or from one end with an abutment member for the opposite end. In the embodiment of the invention illustrated there is a tendency for the metal to bow or collapse inwardly, as indicated in Fig. 1. However, the desired result may be obtained by confining the inner walls of the tube and then subjecting the tube to end pressure outward collapsing will follow. It has been found satisfactory in carrying out the method to cause the tube to collapse in the manner indicated.

After this step is accomplished it will be evident that the thickness of the walls in the area A is considerably increased, and this thickness is of the order of twice the thickness of the adjacent tube walls, thereby greatly enhancing the strength of the area A as compared with the strength of the adjacent walls.

Thereafter a mandrel 12 of substantially the diameter of the inside of the tube is forced therein, as indicated in Fig. 2, to make uniform the diameter of the tube throughout and provide an outwardly extending projection 13 on the outside of the tube. The projection 13 serves as a seat for the spring perch, as will hereinafter appear.

Thereafter, the enlargement 13 of the tube is subjected to a squeezing operation, either in a press or by any other suitable means. By means of this squeezing effect the tube in the region of the thickened wall area assumes a shape substantially as indicated in Fig. 4, in which the top 14 and bottom 15 are substantially flat, and the opposite, vertically disposed sides 16 are outwardly bowed. By outwardly bowing the sides in this manner the spring perch seat is enabled to successfully withstand greater stresses than it could otherwise. By having the sides bowed in this manner a certain amount of spring action is available to the structure which has been found effective in enhancing the strength, rigidity and durability of the axle. It will be understood that a spring perch seat after the above described manner is formed adjacent each end portion of the axle, description of the formation of one being considered sufficient. In order to receive the spring perch bolt a hole 14ᵃ is drilled through the flattened sides 14 and 15 so that the bolt may extend through the seat and be rigidly secured in place.

It will be manifest to those skilled in this art a tubular axle not only presents a pleasing appearance but is much lighter than the usual I-beam type of axle. The difficulty heretofore experienced in producing an axle of this type has been not only in the provision of an adequate support for the spring perches, but also the formation of the end portions of the axle so that these may be sufficiently rigid to withstand the stresses and strains to which they are subjected. In accordance with this invention the end portions of the tube axle are solid. As shown in Fig. 5, a plug 15 of steel, or other suitable material, and of slightly less diameter than the inside of the tube, is inserted part way into an end of the tube. Thereafter, the end portion of the tube is swaged into intimate contact with the plug, and by heating the assembly the plug and tube are welded together. Thereafter, the end portions are forged into the shape substantially as shown in Fig. 7 to provide vertical bearing portions 16 and bearing portions 17. Through the vertical bearing portion 16 a hole 18 may then be drilled and a hole 19 through the bearing portion 17.

It will be seen that I have provided a structure which satisfy the objects enumerated above, and one which constitutes a valuable advance in the art. While I have shown the invention in a certain physical embodiment, it is to be understood that modification of the structure shown may be made by those skilled in this art without departing from my invention as expressed in the following claims.

What I claim is:

1. An automobile axle comprising a thin walled tube having spring seats adjacent opposite ends thereof, the thickness of the tube in the region of said seats being increased uniformly, opposed outwardly bowed sides for said seats, and flattened upper and lower surfaces for said seats, said outwardly bowed sides being disposed inwardly of the outside of the tube and said flattened surfaces being disposed outwardly of the outside of the tube.

2. An automobile axle comprising a thin walled tube having spring seats adjacent opposite ends thereof, the thickness of the tube in the region of said seats being increased uniformly, opposed outwardly bowed sides for said seats, and flattened upper and lower surfaces for said seats, said outwardly bowed sides being disposed inwardly of the outside of the tube and said flattened surfaces being disposed outwardly of the outside of the tube, and the distance between said flattened surfaces being greater than the distance between said outwardly bowed sides.

GEORGE B. STORER.